United States Patent Office 3,459,089
Patented Aug. 5, 1969

3,459,089
CUTTING BLOCK COMPOSITIONS CONTAINING TRANS-1,4 POLYMERS OF ISOPRENE
Roy Clark, Sarnia, Ontario, Canada, assignor to Polymer Corporation Limited, Sarnia, Ontario, Canada, a body corporate and politic
No Drawing. Filed Jan. 23, 1967, Ser. No. 610,820
Claims priority, application Canada, Feb. 16, 1966, 952,363
Int. Cl. C08f 29/08; B26d 7/20
U.S. Cl. 83—568          9 Claims

ABSTRACT OF THE DISCLOSURE

A thermoplastic the composition comprising a blend of a major proportion by weight of total polymer of a synthetic crystalline trans-1,4 polymer of isoprene, with a minor proportion by weight of total polymer of a compatible polymer of an olefin together with 30–150 parts by weight per 100 parts by weight total polymer of a filler having an average particle size less than 45 microns. The composition may be used as the blade-facing portion of the cutting block.

---

This invention relates to compositions of thermoplastic polymers. More particularly it relates to a composition comprising a blend of a thermoplastic rubber with an olefin polymer suitable for the preparation of cutting blocks.

In the art of employing a die or device having a cutting edge, there is used a pad or facing material upon which the cutting device may cut, die out, or stamp out articles of many shapes from a supply stock. The pad or facing material must have a degree of rigidity yet a hardness which is less than that of the cutting device to prevent dulling of the cutting edge. Various materials have been tried but there is a need for a pad material which does not have to be discarded after limited use but rather can be re-finished or re-shaped for further use.

It is an object of this invention to provide a thermoplastic composition which has a suitable degree of hardness without being brittle and can be readily re-shaped to give a fresh surface suitable for prolonged use as a pad or block upon which to die out or cut materials. Another object is to provide a die or knife cutting block for an unvulcanized thermoplastic composition.

These and other objects may be achieved in a thermoplastic composition comprising a blend of a major portion, by weight of total polymer, of a synthetic crystalline trans-1,4 polymer of isoprene, with a minor portion, by weight of total polymer, of a compatible polymer of an olefin, together with 30 to 150 parts by weight, per 100 parts by weight total polymer, of a filler having a particle size less than 45 microns. In a preferred composition, the synthetic crystalline trans-1,4 polymer is a homopolymer of isoprene having greater than 85% trans-1,4 configuration. In one embodiment of the invention, the compatible polymer in the composition comprises at least 20 parts of an elastomeric polymer of an olefin together with up to 20 parts of a thermoplastic resinous polymer of an olefin said parts being parts by weight per 100 parts by weight total polymer. In another embodiment, the compatible polymer is a rubbery polymer of isobutylene.

The synthetic trans-1,4 polymer of isoprene used in this invention is stereoregular and has a preponderance of the isoprene units linked in the trans-1,4 configuration preferably greater than 85%. Due to substantial crystallinity, i.e. 15 to 30%, this trans-1,4 polymer is thermoplastic, i.e. it softens when heated to a temperature of at least 50° C. yet will harden when cooled at room temperature or below. The methods of producing such polymers by organo-metallic catalysts in solution polymerization are known in the art and are not the subject of this invention. The term "polymer of isoprene" as used herein is understood to mean both homopolymer and copolymers of isoprene. The copolymer may contain a minor proportion, preferably less than 20%, of comonomer units derived from monomers selected from monoolefins such as ethylene, propylene, styrene or diolefins such as butadiene-1,3, hexadiene-1,4, dicyclopentadiene. The polymer of isoprene preferably has a Mooney viscosity (ML-1+4@100° C.)

of between about 10 to 50.

The polymer of an olefin used in the blend of this invention may be any of the known high molecular weight polymers of vinylidene monomer containing at least one $CH_2=C<$ radical. The term "compatible" indicates that the vinylidene polymer readily mixes with the trans-1,4 polymer of isoprene to give a visually uniform mass. The vinylidene polymer may be an elastomer or a thermoplastic resin or a mixture of both. The elastomer may be chosen from natural Hevea rubber, a homo- or copolymer of a $C_4$ to $C_6$ open chain conjugated diolefin, a homopolymer of isobutylene, a copolymer of isobutylene and isoprene known in the art as Butyl rubber, or copolymer of α-olefins with or without an unsaturation conferring third monomer, or any of the known rubbery polymers. Specifically, these include homopolymers of butadiene and isoprene, the copolymers of butadiene and styrene or isoprene, the copolymers of butadiene and styrene or acrylonitrile, the ethylene-propylene rubbers and acrylate rubbers. Where it is desired to employ a thermoplastic resin, this may be selected from those having a softening point between 50 to 125° C. These include polymers of aryl olefins such as styrene, compositions of acrylonitrile, butadiene and styrene known in the art as ABS resins, polymers of methyl methacrylate, polyethylene and polyvinyl chloride. In some instances, it may be advantageous to use both a rubber and a resin, for example, butyl rubber and polyethylene, in blends with the synthetic trans-1,4 polymer of isoprene. The choice will be guided by such factors as type of service, degree of resistance to cutting, severity of cutting, texture and hardness desired and, of course, cost of materials and formulating.

One useful and preferred olefin polymer used in blends with e.g. trans-1,4 polyisoprene is a thermoplastic rubber-resin composition resulting from a blend of a major portion of a rubbery polymer of a $C_4$ to $C_6$ open chain conjugated diolefin hydrocarbon, especially a copolymer containing 10 to 40 weight percent of vinyl aromatic comonomer units and a minor portion of a resinous polymer of a vinyl aromatic hydrocarbon, especially a copolymer containing 5 to 25 weight percent of a $C_4$ to $C_6$ open chain conjugated diolefin comonomer units.

Another particularly useful composition of this invention is prepared from a blend of at least 60 parts of the synthetic crystalline trans-1,4 polymer of isoprene with up to 40 parts of a compatible rubbery polymer of isobutylene, especially a copolymer of isobutylene with isoprene having a chemical carbon-to-carbon unsaturation of 0.5 to 5 mole percent.

The ratio of trans-1,4 polymer of isoprene to olefin polymer in the composition of this invention should be at least 1:1 by weight, although in some applications the presence of the olefin polymer is not essential. The elastomeric olefin is preferably used in amounts of not more than about 25% by weight of the total polymeric composition whereas the resinous olefin may also be used in larger amounts. The ratio is determined by the degree of hardness required in the stock for a particular application. The exact ratio for a specified hardness may readily by determined by testing for hardness on a series of blends of the synthetic trans-1,4 polyisoprene and the chosen compatible olefin polymer. The composition of this invention should have a hardness of 40 to 95 Shore C durometer units.

The trans-1,4 polymer of isoprene may be readily blended with the olefin polymer on an open roll mill or an internal mixer such as a Banbury mixer. The order of blending is not important but it has been found convenient to first add any thermoplastic resin or rubber-resin composition to the mill, and after a warm smooth sheet is evident, then add the trans-1,4 polyisoprene polymer. Once the trans-1,4 polyisoprene has been added, the mixing time should be kept to less than 15 minutes otherwise some degradation may result. However, if desired, blends may be prepared by blending solutions of each of the polymers.

As a third ingredient of the composition of this invention, there is incorporated from 30 to 150 parts by weight of filler per 100 parts of total polymer. It includes materials such as calcium carbonate, hard and soft clays, calcium silicate, magnesium carbonate, precipitated or fumed silicas, barium sulphate, magnesium oxide, mica, diatomaceous earth talc, wood flour and ground cork. Carbon black may also be used if desired. The particle size of the filler used should be such that at least 95% should pass through a 300 mesh screen, or stated otherwise the average particle size should be less than 45 microns. The optimum amount of filler in the composition is determined by the degree of ease of processing and by the hardness of the composition required. Although economically attractive, a high loading of filler results in a loss of the ease of processing and reprocessing on the mill. It is, therefore, preferred to use less than 100 parts filler.

The composition of this invention may also contain minor amounts of other conventional compounding materials such as flame retardants, germicides, antidegradants and colorants. When a moulded article of the composition of this invention is to be re-shaped by milling, calendering or hot-pressing, the addition of a small amount of the crystalline polymer of isoprene aids in re-processing and improving the surface finish of the article.

Illustration of the invention is given in the following examples.

Example I

In this experiment, a composition was prepared by blending crystalline polymer of isoprene with a thermoplastic rubber-resin composition. The polymer of isoprene was polyisoprene having a trans-1,4 configuration of 95%, an X-ray crystallinity of 30% and a Mooney viscosity of (ML-1+4@100°C.) of 25. The thermoplastic rubber-resin composition was a blend of a rubbery copolymer of weight ratio 70/30 butadiene/styrene with a resin copolymer of weight ratio 85/15 styrene/butadiene in ratio giving 54% by weight styrene in sample RR-1 and 63% by weight styrene in sample RR-2, respectively.

The rubber-resin composition was added to an open two-roll mill and banded at a temperature of 83° C., and then the trans-1,4 polyisoprene was added in the amounts shown in Table I and milled in. The fillers also noted in Table I were then mixed into the polymer blend which was then sheeted off the mill and cooled to room temperature. Sections of the 0.9 centimeter sheet were then examined for their resistance to cutting and ability to be re-milled for the purpose of removing cutting marks.

The hardness at room temperature of the stock was measured by conventional Shore C durometer. A 3 centimeter diameter die was then placed on the test stock and struck with a mallet, after which a visual rating of the cut resistance was noted as recorded in table.

The composition C was placed in a retaining frame and clamped to the table of a clicker press to evaluate its use as a cutting board or pad to prevent blunting of the dies. It was observed that after repeated stamping upon by the die, the composition of this invention did not chip or splinter and could be readily re-calendered in less than 10 minutes, cooled and placed back in service as a cutting board with a fresh smooth surface. This re-calendering operation was repeated several times, each time yielding a composition with a fresh operable surface. A conventional cutting block stock was noted to require 60 minutes as well as a higher temperature for re-calendering, and became useless after 3 such re-shapings.

TABLE

| Composition (parts by weight) | A | B | C |
|---|---|---|---|
| Polyisoprene | 80 | 90 | 80 |
| Rubber-resin composition RR-1 | 20 | 10 | |
| Rubber-resin composition RR-2 | | | 20 |
| High abrasion furnace black | 50 | 50 | |
| Hi-Sil 233 [1] | | | 50 |
| Hardness, Shore C | 78 | 79 | 80 |
| Cut-resistance rating | Good | Good | Excellent |

[1] Hi-Sil 233: Trademark for a non-pyrogenic silica comprising about 89% SiO$_2$ and having an average particle size of 0.022 micron.

Example II

The composition C of Example I was evaluated as a mandrel for cutting jar rings. The compound was extruded as a tube at a barrel temperature of 83° C., the extrudate rapidly cooled to a rigid tube. After successful use as a mandrel, the tube was shown to be readily re-extruded for further use.

Example III

A further experiment was performed in which 80 parts by weight of the trans-polyisoprene of Example I was blended in a Banbury mixer with 20 parts by weight of an oil-extended styrene-butadiene rubber having a Mooney viscosity (ML-1+4@100° C.) of 45 and containing 37 parts of highly aromatic extender oil per 100 parts by weight of non-extended rubber. 80 parts by weight of a precipitated calcium carbonate filler (having a specific gravity of 2.7 and a particle size such that 98% was below 0.5 micron, and available under the trademark Calcene T) was then mixed into the polymer. The mixing procedure was as follows: start with the Banbury at 93° C. with the maximum temperature controller at 133° C., add the polymers and mix, add one-half of the filler at 1½ minutes and the other half of the filler at 3 minutes. At 5½ minutes, the mix was dumped from the mixer, sheeted out on a roll mill at 93° C. and cooled. Ease of processing on the mill and a pleasant smooth appearance were noted.

This composition was measured for Shore C hardness and a value of 64 was recorded. Cut resistance and severity of cut was evaluated as follows: a strip sample measuring 0.6 centimeter in thickness and 5 centimeters in width was placed on a steel backing under a guillotine fitted with a blade weighing 2.7 kilograms and having a 60° cutting edge; the height of the blade was increased until the sample composition was cut through over the full width. It was found that a height of 89 centimeters was required, the cut being smooth and neat without any shattering. The composition was readily re-milled, sheeted smoothly, thus presenting a fresh neat surface for re-use.

Example IV

The experiment of Example III was repeated on a composition consisting of 70 parts by weight of trans-polyisoprene of Example I, 30 parts by weight of a Butyl rubber (isobutylene/isoprene copolymer), having a chemical unsaturation of 1.6 mole % and a Mooney viscosity (ML-1+4 @ 100° C.) of 75, and 50 parts by weight of soft kaolin (hydrated aluminium silicate, having a specific gravity of 2.6, a particle size such that 99% passes a 300 mesh screen and available under the trademark McNamee clay). The stock mixed readily and, when sheeted off the mill, was visibly uniform and limp.

This composition had a Shore C hardness of 50. When tested for cut resistance as in Example III, it was found that using a blade weighing 3.6 kilograms, that a height of 89 centimeters was required to cut through, and even then the severity of the cut was low. No shattering of the composition was observed. The composition was readily re-milled to provide a fresh smooth working surface.

A similar composition was prepared from the trans-1,4 polyisoprene and low density polyethylene and soft clay and found to possess a desirable degree of cut resistance.

In the foregoing examples, it may be seen that the compositions of this invention possess the necessary combination of properties such as sufficient hardness and resistance to cutting together with the absence of tendency to chip and of dulling action on the die or knife edge.

What is claimed is:

1. As an article of manufacture, a cutting pad or block comprising an unvulcanized thermoplastic composition consisting essentially of:
    (i) from about 60 to about 90 parts synthetic crystalline trans-1,4 polymer of isoprene;
    (ii) from about 10 to about 40 parts of a high molecular weight polymer selected from the group consisting of (a) a thermoplastic rubber-resin composition resulting from a blend of a rubbery polymer of a $C_4$ to $C_6$ open chain conjugated diolefin hydrocarbon and a resinous polymer of a vinyl aromatic hydrocarbon, (b) an oil-extended rubbery homo- or copolymer of a $C_4$ to $C_6$ open chain conjugated diolefin hydrocarbon, and (c) rubbery polymer of an isoolefin; and
    (iii) from about 30 to about 150 parts of a filler having an average particle size less than 45 microns, said parts being parts by weight per 100 parts by weight total polymer, said unvulcanized composition having a hardness of from about 40 to 95 Shore C durometer units.

2. The article as claimed in claim 1, wherein the synthetic crystalline polymer of isoprene is a homopolymer having a trans-1,4 configuration of the isoprene units of greater than 85%.

3. The article as claimed in claim 2, wherein said polymer of isoprene has a Mooney viscosity (ML-1+4 @ 100° C.) of 10 to 50.

4. The article as claimed in claim 2, wherein, in said rubber-resin composition, the rubber is a copolymer containing 10 to 40% of vinyl aromatic comonomer units, and the resin is a copolymer containing 5 to 25% of a $C_4$ to $C_6$ open chain conjugated diolefin comonomer units.

5. The article as claimed in claim 4, wherein the vinyl aromatic comonomer is styrene and the diolefin comonomer is butadiene-1,3.

6. The article as claimed in claim 2, wherein the oil-extended rubbery polymer is a styrene/butadiene-1,3 rubber containing about 37 parts of extended oil per 100 parts of non-extended rubber.

7. The article as claimed in claim 2, wherein the rubbery polymer of an isoolefin is a copolymer of isobutylene/isoprene having from 0.5 to 5 mole percent unsaturation.

8. The article as claimed in claim 1, wherein the filler comprises less than 100 parts by weight.

9. The article as claimed in claim 7, wherein the filler is a soft clay-type filler and present in the amount of about 50 to 100 parts.

References Cited

UNITED STATES PATENTS

| | | | |
|---|---|---|---|
| 3,213,160 | 10/1965 | Crouch | 260—894 |
| 3,250,733 | 5/1966 | Giller | 260—888 |
| 3,326,824 | 6/1967 | Graham | 260—894 |
| 3,362,937 | 1/1968 | Kent | 260—888 |
| 2,575,378 | 11/1951 | Bender | 83—658 |
| 2,611,757 | 9/1952 | Olsen | 83—658 |

FOREIGN PATENTS

| | | |
|---|---|---|
| 696,901 | 10/1964 | Canada. |
| 727,493 | 2/1966 | Canada. |

MORRIS LIEBMAN, Primary Examiner

SAMUEL C. FOX, Assistant Examiner

U.S. Cl. X.R.

260—41, 888, 889, 892, 894